(12) United States Patent
Kawaguchi et al.

(10) Patent No.: US 6,835,435 B2
(45) Date of Patent: Dec. 28, 2004

(54) STAMPER, MOLD SYSTEM, RECORDING MEDIUM SUBSTRATE, RECORDING MEDIUM, OPTICAL DISC SUBSTRATE, OPTICAL DISC, AND METHOD FOR PRODUCING STAMPER

(75) Inventors: Yuuichi Kawaguchi, Tokyo (JP); Kenji Yamaga, Tokyo (JP); Hiroaki Takahata, Tokyo (JP); Hisaji Oyake, Tokyo (JP); Yoshimi Sakai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/718,801

(22) Filed: Nov. 24, 2003

(65) Prior Publication Data

US 2004/0101650 A1 May 27, 2004

Related U.S. Application Data

(62) Division of application No. 10/103,113, filed on Mar. 22, 2002.

(30) Foreign Application Priority Data

Mar. 30, 2001 (JP) ........................................ 2001-102639
Mar. 30, 2001 (JP) ........................................ 2001-102640

(51) Int. Cl.[7] ................................................. B32B 3/02
(52) U.S. Cl. ................. 428/64.1; 428/64.4; 430/270.11
(58) Field of Search .............................. 428/64.1, 64.4, 428/913; 430/270.11, 495.1, 945

(56) References Cited

U.S. PATENT DOCUMENTS

| 4,479,853 | A | 10/1984 | Prusak |
| 5,987,003 | A | 11/1999 | Yokota |
| 6,319,580 | B1 | 11/2001 | Araki |
| 6,576,317 | B2 | 6/2003 | Yoshimura et al. |

FOREIGN PATENT DOCUMENTS

| JP | 05-28533 | 2/1993 |
| JP | H05-200791 | 8/1993 |
| JP | 5-325254 | 12/1993 |
| JP | 07-57297 | 3/1995 |
| JP | 7-282468 | 10/1995 |
| JP | H10-289489 | 10/1998 |
| JP | H11-073691 | 3/1999 |
| JP | H11-086355 | 3/1999 |
| JP | H11-086356 | 3/1999 |
| JP | H11-203724 | 7/1999 |
| JP | 2000-263615 | 9/2000 |

*Primary Examiner*—Elizabeth Mulvaney
(74) *Attorney, Agent, or Firm*—Oliff & Berridge PLC

(57) ABSTRACT

A stamper for forming a data recording region on a recording medium substrate by means of a transfer surface thereof. The transfer surface transfers a predetermined set of data to the recording medium substrate. The stamper is fitted on at least one of metal molds that are arranged opposite one another for forming the recording medium substrate. The stamper includes a stepped portion formed as bends in the material of the stamper. The stepped portion is configured to project from the transfer surface toward the recording medium substrate.

33 Claims, 12 Drawing Sheets

STAMPER, MOLD SYSTEM, RECORDING MEDIUM SUBSTRATE, RECORDING MEDIUM, OPTICAL DISC SUBSTRATE, OPTICAL DISC, AND METHOD FOR PRODUCING STAMPER

This is a Divisional of application Ser. No. 10/103,113 filed Mar. 22, 2002. The entire disclosure of the prior application is hereby incorporated by reference herein in its entirety.

BACKGROUND OF THE INVENTION

1. Field of Invention

The present invention relates to a recording medium substrate, a recording medium, a stamper and a mold system for forming recording medium substrate, a substrate for optical disc, an optical disc and a production method for stampers.

2. Description of the Related Art

An optical information recording medium such as a compact disc (CD), a mini-disc (MD), and a digital versatile disc (DVD) is widely in use in audio, video, and computer systems for recording various types of information. However, recording densities of these optical information recording medium need to be further increased as the amount of information that a medium must record is expected to increase significantly.

In order to increase the recording density of recording medium, such as optical discs, it is crucial to reduce the spot diameter of focused laser beam. This requires the use of laser beam with a shorter wavelength or objective lenses with a higher numerical aperture (NA) in the laser optical system.

The laser beam is focused on a data recording surface through a light-transmitting layer formed over the data recording surface. An attempt to decrease the wavelength of the laser beam or increase the NA of the objective lens is likely to cause a significant optical aberration. For this reason, the thickness of the light-transmitting layer must be kept as small as possible so arecordduce the optical aberration.

Production of CD and MD typically involves the use of laser beam with a wavelength of 780 nm, a lens with an NA of 0.45, and a light-transmitting layer with a thickness of 1.2 mm; whereas production of DVD, a recording medium having a higher recording density than CD, requires the use of laser beam with a wavelength of 650 nm, a lens with an NA of 0.6, and a light-transmitting layer with a thickness of 0.6 mm. A substrate formed through the injection-molding process using a transparent material can be used to serve as such a light-transmitting layer.

In the pursuit of higher recording densities, even thinner light-transmitting layers are required as the wavelength of the laser beam is further decreased or the NA increased. However, reduction in the thickness of the substrate while maintaining a high precision has become ever more difficult through the conventional injection-molding process (including injection-compression). In other words, with optical discs of the conventional construction, the attempt to increase the recording density by decreasing the wavelength of laser beam or increasing the NA of the objective lens faces a technical limitation due to the difficulty in making a thinner substrate to serve as the light-transmitting layer.

To overcome such a technical limitation, some optical discs, such as that disclosed in Japanese Patent Laid-Open Publication No. Hei 10-289489, is constructed by first forming a relatively thick protection plate to serve as a substrate. This substrate is formed through injection-molding and does not need to transmit light. A film for data recording/a reflective film for data retrieval is then formed on a data recording surface of the substrate, followed by formation of a thin light-transmitting layer on top of the film. This construction not only permits formation of thin light-transmitting layers but also provides mechanical strength for the overall structure. Thus, such optical discs can readily be adapted to laser beam with a decreased wavelength or a lens with an increased NA.

The light-transmitting layer may be formed by spin-coating a UV-curing resin solution onto a substrate and curing the resin, or by placing a separately prepared transparent sheet over the substrate and applying an adhesive such as a UV-curing resin or an adhesive material to bind the sheet to the substrate. However, the approach using the transparent sheet to be bound to the substrate has strict requirements for the optical characteristics and the precision in thickness of the light-transmitting layer and thus leads to a high manufacturing cost. In comparison, the approach using the spin-coating process can achieve the required characteristics relatively easily. Specific examples of the spin-coating processes used to form light-transmitting layers are disclosed, for example, in Japanese Patent Laid-Open Publication No. Hei 10-289489, Japanese Patent Laid-Open Publication No. Hei 11-73691 and Japanese Patent Laid-Open Publication No. Hei 11-203724.

Although the recording density can be increased through the use of the optical discs with the above-described structure, which includes a protection plate to serve as a substrate, these optical discs have problems in terms of their manufacturing technologies. These problems are as described below:

1) Problem of Errors in Substrate Contruction

When injection-molded, the substrate may have a larger thickness in the area near its periphery than in the area near its center because different areas of a substrate cool down at different rates. Specifically, as shown in FIG. 12, a bump 2, called as "ski jump", may be formed on the periphery of an injection-molded plastic substrate 1. The bump 2 may affect the incident angle and the reflection angle of the laser beam or it may collide with the laser optical system such as an objective lens. For this reason, the substrate must be post-treated to remove the bump 2 as described in, for example, Japanese Patent Laid-Open Publication No. 5-200791. This leads to an increased manufacturing cost.

2) Problem of Flash Formed on Substrates

Referring to FIG. 13, a mold system 100 is shown for manufacturing substrates of the type described above. The mold system 100 includes a ring mold 102 to form an outer peripheral surface of a substrate 1, planar molds 104 and 106 arranged on opposite sides of the ring mold 102 to form top and bottom surfaces of the substrate 1, respectively, and a pair of stampers 108 placed adjacent to the planar molds 104 and 106. Only one stamper 108 may be placed adjacent to one of the planar molds 104 and 106 although two of them are arranged in the example shown. When only one stamper 108 is arranged adjacent to either one of the planar molds 104 and 106, the other of the planar molds 104 and 106 may be formed integrally with the ring mold 102.

The stamper 108 includes a transfer surface 108A on which microscopic projections/recesses are formed to correspond to the information signals and information grooves to be record. The substrate 1 with a surface having the microscopic projections/recesses transferred from the transfer surface 108A of the stamper 108 can be obtained by filling a cavity defined by the mold system 100 with a resin material. The area including the transferred microscopic projections/recesses serves as a data recording region.

However, as shown by an enlarged view in FIG. 14(A), the resin material tends to seep into the gap between the ring mold 108 and the stamper, forming a flash B on the circumference of the substrate 1. As shown in FIG. 14(B), when the substrate 1 is removed from the mold system 100, the flash B may be bent in a direction perpendicular to the surface of the substrate to project from the data recording region (i.e., the surface of the substrate) or it may come off the substrate 1 and stick to the data recording region. If the substrate 1 with such flash B is subjected to spin-coating to form a light-transmitting layer, the flash B causes accumulation of the coating solution. This results in non-uniform, or defective film formation. For this reason, the flash B must be cut off or removed in advance. This is also the case with the conventional optical recording medium, which employ the substrate to serve as a light-transmitting layer.

3) Problem of Damage to Molds

As described above with reference to FIG. 14, the stamper 108 and the ring mold 102 need to be pushed against one another by applying a substantial force in order to eliminate the gap and thereby reduce the occurrence of the flash B. This can damage edges 110A of inner peripheral wall 10 of the ring mold 102 and lead to frequent replacement of the ring mold 102. Furthermore, thermal expansion or contraction of the stamper caused by the heat of the molten resin is disrupted, making the molding process difficult.

4) Problem of Non-Uniform Thickness of Light-Transmitting Layer

The spin-coating process is a process to apply a coating solution to a surface of a substrate by letting the coating solution flow over the surface while the substrate is rotated on a spindle. Rotation of the substrate causes the coating solution to evenly spread over the surface of the substrate. Although the process is advantageous in that the thickness of the coating solution may be adjusted by controlling the rotation rate of the spindle, the time that the coating is applied, and the viscosity of the coating solution, it is accompanied by a problem that the coating solution tends to accumulate in the area near the circumference of the substrate, forming a thick part there. This problem is further described below.

Referring to FIG. 15, for example, the substrate 1 includes on its top surface a blank region 3 having a predetermined width and extending on an outermost part of the substrate 1, and a signal recording region 4 extending adjacent to the blank region 3 on the inner side of the blank region 3. A light-transmitting layer 5 is arranged over the top surfaces of the blank region 3 and the signal recording region 4. The light-transmitting layer 5 is formed by spin-coating a resin material and curing it, such that a bump 5A is formed over the outermost part of the signal recording region 4 and the blank region 3. If the light-transmitting layer 5 has a relatively large thickness (for example, 100 cm) for the layers formed by using the spin-coating process, the thickness T and the width W of the bump 5A become so large that the bump 5A overlaps the signal recording region 4 and thereby reduces the area that can be used for recording information.

Aside from this, there is a significant chance that the bump 5A collides with the laser optical system. Accordingly, the substrate must be subjected to a post-treatment to remove the bump 5A as described, for example, in Japanese Patent Laid-Open Publication No. Hei 11-86355 and Japanese Patent Laid-Open Publication No. Hei 11-86356. This leads to an increased manufacturing cost.

Japanese Patent Laid-Open Publication No. Hei 11-86356 describes a process for removing the bump 5A as shown in FIGS. 16(A) and 16(B), in which a light-transmitting layer 5 is first formed on a surface of a substrate 1 having a larger diameter than that shown in FIG. 15, and the entire outer portion of the substrate 1 including the bump 5A is subsequently removed by, for example, cutting.

A drawback of this approach is that, if the removal of the outer portion of the substrate is not carried out in a precise manner, the concentricity of the outer peripheral surface (circumferential side) of the substrate with respect to the inner peripheral surface of the substrate can be decreased, affecting the dynamic balance of the disc when it is mounted on a disc drive and rotated. As a result, normal recording/ playing operations of the disc are interrupted. In addition, the process has a low yield in terms of the materials of the substrate since the outer portions of the substrates are discarded.

SUMMARY OF THE INVENTION

The present invention addresses the above-mentioned problems associated with the prior art. Accordingly, it is an objective of the present invention to reduce the manufacturing cost of the recording medium substrates and prevent the non-uniform area on the outer periphery of the substrates or the light-transmitting layers from expanding, without reducing the concentricity and without requiring a significant cost. It is also an objective of the present invention to provide an optical disc formed from the recording medium substrate in which non-uniform area on the outer periphery of the light-transmitting layer is prevented from expanding.

In the course of his studies on the structure of stampers and molds, and the shape and the structure of substrates, the present inventor has discovered that the non-uniformity in the outer periphery of the light-transmitting layer can be prevented by modifying the shape of the substrate. In summary, the above-described objectives are achieved by the following aspects of the present invention.

(1) A stamper for forming at least a data recording region on a recording medium substrate through a transfer surface thereof, the transfer surface transferring a predetermined set of data to the recording medium substrate, the stamper fitted on at least one of metal molds that are arranged opposite one another for forming the recording medium, wherein a stepped portion formed as bends in the material of the stamper, and the stepped portion is configured to project from the transfer surface toward the recording medium substrate.

(2) The stamper described in (1) above, wherein the stepped portion is formed to have a circular shape and the circle is sized so that an end surface of the stepped portion engages an edge of an inner peripheral wall of the mold, the inner peripheral wall forming an outer peripheral surface of the recording medium substrate.

(3) The stamper described in (2) above, wherein the end surface of the stepped portion is bent on either radial end thereof so that the stepped portion has a radial cross-section that projects toward the recording medium substrate.

(4) A mold system including: a ring mold having an inner peripheral wall for forming an outer peripheral surface of a recording medium substrate; a pair of planar molds arranged opposite one another for forming top and bottom surfaces of the recording medium substrate; and a stamper fitted on at least one of the pair of planar molds, the stamper forming a data recording region on the recording medium substrate through a transfer surface thereof, the transfer surface transferring a predetermined set of data to the recording medium substrate; wherein the stamper is provided with a stepped portion formed as bends in the material of the stamper, the stepped portion being configured to project from the transfer surface toward the recording medium substrate.

(5) The mold system described in (4) above, wherein the stamper is fitted on the planar mold with a side of the stepped portion that is opposite to the substrate defining a space.

(6) A recording medium substrate made by using a mold system, the mold system including: a ring mold having an inner peripheral wall for forming an outer peripheral surface of a recording medium substrate; a pair of planar molds arranged opposite one another for forming top and bottom surfaces of the recording medium substrate; a stamper fitted on at least one of the pair of planar molds, the stamper forming a data recording region on the recording medium substrate through a transfer surface thereof, the transfer surface transferring a predetermined set of data to the recording medium substrate, wherein the stamper is provided with a stepped portion formed as bends in a material of the stamper, the stepped portion being configured to project from the transfer surface toward the recording medium substrate.

(7) The recording medium substrate according to (6), wherein the recording medium substrate has a circumferential recess formed radially outside the data recording region on at least one of the surfaces of the recording medium substrate, the recess formed by the stepped portion of the stamper in the mold system.

(8) The recording medium substrate according to (7), wherein a radially outermost edge of the recess on one of the surfaces is lower than a radially innermost edge of the recess as viewed along the thickness of the recording medium substrate.

(9) The recording medium substrate according to any one of (7) or (8), wherein the radially outermost edge of the recess on one of the surfaces is lower than the radially innermost edge of the recess and is higher than a deepest point of the recess as viewed in the thickness of the recording medium substrate.

(10) The recording medium substrate according to any one of (7) to (9), wherein the recess has a depth that gradually decreases as it extends radially outward from the deepest point, the recess substantially smoothly continues to a peripheral region thereof so that the peripheral region has saw-tooth shape in its radial cross-section.

(11) The recording medium substrate according to any one of (7) to (10), wherein the radially innermost edge of the recess is positioned at a distance of 0.965d from the center of the substrate or further, preferably 0.975d or further, and more preferably 0.983d or further, assuming d is the radius of the outermost circumference of the substrate.

(12) A recording medium including a recording medium substrate and a light-transmitting layer disposed on at least one of surfaces of the recording medium substrate, wherein the recording medium substrate is made by using a mold system, the mold system including: a ring mold having an inner peripheral wall for forming an outer peripheral surface of a recording medium substrate; a pair of planar molds arranged opposite one another for forming top and bottom surfaces of the recording medium substrate; a stamper fitted on at least one of the pair of planar molds, the stamper forming a data recording region on the recording medium substrate through a transfer surface thereof, the transfer surface transferring a predetermined set of data to the recording medium substrate, wherein the stamper includes a stepped portion formed as bends in a material of the stamper, the stepped portion being configured to project from the transfer surface toward the recording medium substrate.

(13) A method for producing a stamper using a stamper production disc having a negative pattern region that includes microscopic projections/recesses that are a negative image of a data pattern to be formed on a recording medium substrate, the stamper being fitted on at least one of metal molds that are arranged opposite one another for forming the recording medium substrate, the stamper forming a data recording region on the recording medium substrate through a transfer surface thereof, the transfer surface transferring a predetermined set of data to the recording medium substrate, the method comprising the steps of: forming on the stamper production disc a circumferential recess for forming a stepped portion, the recess having a larger depth and a larger width than the microscopic projections/recesses; and forming the stamper by using the stamper production disc, the stamper having the circumferential stepped portion that is formed by bending a material of the stamper by means of the recess, the stamper having a transfer surface transferred from the negative pattern region.

(14) A method for producing a stamper using a master disc and a mother disc, the stamper being fitted on at least one of metal molds that are arranged opposite one another for forming a recording medium substrate, the stamper forming a data recording region on the recording medium substrate through a transfer surface thereof, the transfer surface transferring a predetermined set of data to the recording medium substrate, the method comprising the steps of: forming the master disc having a negative pattern region that is a negative image of a data pattern to be formed on the recording medium substrate; forming the mother disc using the master disc, the mother disc having a positive pattern region transferred from the negative pattern region; forming on the mother disc in the vicinity of the positive pattern region a recess for forming a stepped portion, the recess having a larger depth and a larger width than microscopic projections/recesses of the positive pattern region; and forming the stamper using the mother disc, the stamper having the stepped portion formed by the recess as bends in a material of the stamper, the stamper having the transfer surface transferred from the positive pattern region.

(15) A method for producing a stamper using a master disc and a mother disc, the stamper being fitted on at least one of metal molds that are arranged opposite one another for forming a recording medium substrate, the stamper forming a data recording region on the recording medium substrate through a transfer surface thereof, the transfer surface transferring a predetermined set of data to the recording medium substrate, the method comprising the steps of: forming the master disc having a positive pattern region that substantially matches a data pattern to be formed on the recording medium substrate; forming a first mother disc using the master disc, the first mother disc having a negative pattern region transferred from the positive pattern region; forming a second mother disc using the first mother disc, the second mother disc having a second positive pattern region transferred from the negative pattern region; forming a recess for forming a stepped portion either on the master disc in the vicinity of the positive pattern region or on the second mother disc in the vicinity of the second positive pattern region, the recess having a larger depth and a larger width than microscopic projections/recesses of the patterns; and forming the stamper using the master disc or the second mother disc, the stamper having the stepped portion formed by the recess as bends in a material of the stamper, the stamper having the transfer surface transferred from the positive patter region or the second positive pattern region.

As used herein, a "signal recording region" refers to a region in which signals are pre-recorded, or to be recorded, in a substantially continuous manner, starting from the inner side of the substrate. As used herein, a "center of the substrate" refers to a point given by an intersection of at least two imaginary lines each representing a diameter of the substrate.

The present inventor has taken advantage of a conventional stamper, whose primary purpose is to form (or transfer) the data recording region on the substrate, and modified it to actively control and determine the shape of the substrate. Unlike the microscopic projections/recesses, which are formed on the surface of the stamper and intended for recording information in the forms of pits and grooves, the above-described stepped portion formed on the stamper serves to shape the substrate and is formed as a "bend" in the stamper. As used herein, a "bend" refers not only to constructions obtained by bending a planar stamper through processes such as press working but also to those pre-formed into the stamper upon its formation through processes such as electroplating to include a seemingly bent portion.

In this manner, any recessed shape can be integrally formed into the substrate by making use of the stepped portion of the stamper while positively minimizing formation of flash.

In particular, a circular recess can be formed on the outer periphery of the substrate by employing a circular stepped portion. This prevents formation of a so called ski jump on the substrate.

Although formation of flash is inevitable at the circumferential edge of the substrate, it is formed on the substrate along a radially outermost edge of the recess, where the end surface of the stepped portion engages the inner peripheral wall of the mold. Since the position of this flash is lower than that of the data recording region of the substrate when viewed along the thickness of the substrate, accumulation of the coating solution during formation of the reflective layer or the light-transmitting layer through spin-coating is prevented. Otherwise, the accumulation of the coating solution affects the data recording region.

Although formation of the recess on the optical disc substrate appears to be irrational as it seemingly prevents the coating solution from smoothly spreading out during spin-coating, in reality, the centrifugal force resulting from rotation of the substrate causes the coating solution to spread past the recess toward the peripheral region (or, the radially outermost edge of the recess), forming a bump there, and when the rotation of the substrate is stopped, the solution forming the bump flows back into the recess.

As a result, formation of the coating solution bump is effectively prevented. In addition, the radial width of the recess can be made relatively small while preventing bump formation, making it possible to design a larger data recording region. The recess of such construction also serves to prevent increase in thickness of the peripheral region of the substrate caused by thermal contraction that occurs after injection-molding and thus serves to prevent formation of the so called ski jump.

In short, the recess formed by the stepped portion in the peripheral region of the substrate helps eliminate the coating solution bump formed in the peripheral region during the spin-coating process. Hence, any layer, including the light-transmitting layer, can be disposed on the substrate with a smoother and flatter surface than ever.

Further, by making use of the recess and forming the peripheral region of the substrate to have a saw-tooth shape (in its cross-section), the coating solution can readily spatter off the substrate during spin-coating and accumulation of the coating solution in the bump is reduced. This further reduces bump formation.

As set forth, the present invention, employing a simple construction of a recess formed on the substrate, effectively prevents thickening of the substrate in its peripheral region as well as formation of a bump in the periphery of the light-transmitting layer and thereby realizes a significant reduction in manufacturing costs.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF PREFERRED EMBODIMENTS

An embodiment of the present invention will now be described in detail with reference to the accompanying drawings.

Figure 1:
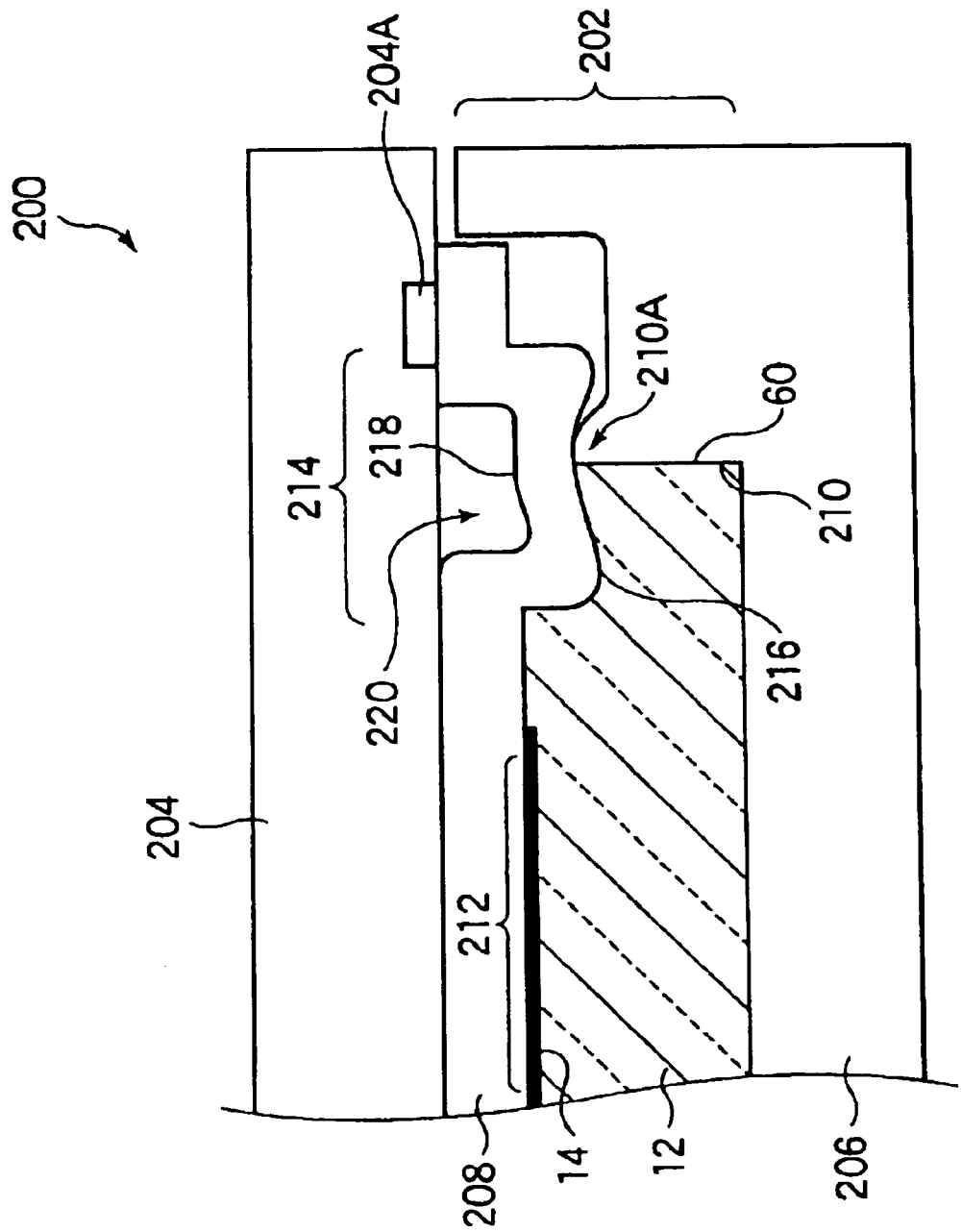
FIG. 1 is a cross-section of one embodiment of a mold system in accordance with the present invention.

Referring to FIG. 1, a mold system 200 in accordance with the present invention is shown. The mold system 200 includes a ring mold 202, planar molds 204 and 206 arranged opposite one another, a stamper 208 arranged adjacent to one of the planar molds 204 and 206 (204, in the example shown). In the example shown, the planar mold 206 is formed integral with the ring mold 202. The ring mold 202 includes an inner peripheral wall 210 for forming an outer peripheral surface 60 of a recording medium substrate 12. Top and bottom surfaces of the substrate 12 are formed by the pair of planar molds 204 and 206, respectively. The stamper 208 includes a transfer surface 212, which has microscopic projections/recesses for transferring a predetermined set of data to a data recording surface (region) 14 formed on the substrate 12. The data recording surface 14 includes not only those that have signals pre-recorded continuously from the inner side of the disc but also those on which signals can be recorded from the inner side of the disc (e.g., CD-R).

Figure 2:
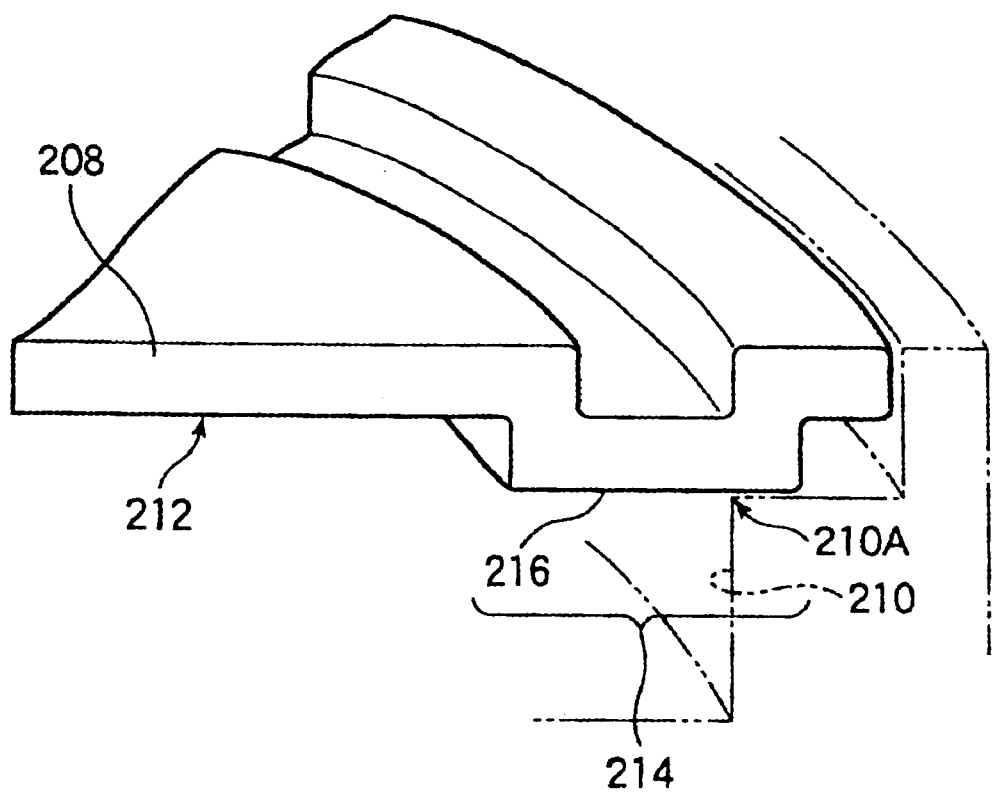
FIG. 2 is an enlarged cross-section of a stepped portion of a stamper in the mold system.

Referring to FIG. 2, the stamper 208 is shown removed from the mold system 200. The stamper 208 includes a stepped portion 214, which projects from the transfer surface 212 toward the substrate 12 (during molding of the substrate) and is formed as a bend in the material. In this embodiment, the stepped portion 214 is formed to have a circular shape and the circle is sized so that an end surface 216 of the stepped portion 214 engages an edge 210A of the inner peripheral wall 210 of the ring mold 202.

Specifically, the end surface 216 of the stepped portion 214 is bent on either end thereof when viewed along the radial direction. As a result, the stepped portion 214 has a radial cross-section that projects toward the substrate 12. It should be appreciated that the construction of the stepped portion 214 is not limited to that described but includes any other shapes. For example, it may be formed to include only one bend on the end of the end surface 216 that is radially inside. In short, it may be any shape that projects toward the substrate 12.

Referring again to FIG. 1, the edge 210A of the inner peripheral wall 210 of the ring mold 202 is formed to project toward the stamper 208. The stamper 208 is held in place by the action of negative pressure in a suction groove 204A formed on the planar mold 204. In this state, a side 218 of the stepped portion 214 of the stamper 208 that is opposite to the substrate 12 and the planar mold 204 together defines a space 220 between them.

As a result, the edge 210A pushes the end surface 216 of the stepped portion 214 upward as the ring mold 202 and the planar mold 204 come close to one another. This causes the material of the stamper 208 to elastically deform so that the end surface 216 is bent toward the planar mold 204 in its central region. In this manner, the edge 210A and the end surface 216 are held in contact with a proper pressure. Although the space 220 defined by the side 218 of the stepped portion 214 is empty in the example shown, the space 220 may be filled with an elastically deformable resin material so that a desired reaction force acts against the upward force exerted by the edge 210A. Alternatively, a metal member may be inserted into the space 220 to completely prevent the end surface 216 from bending inward.

Figure 3:
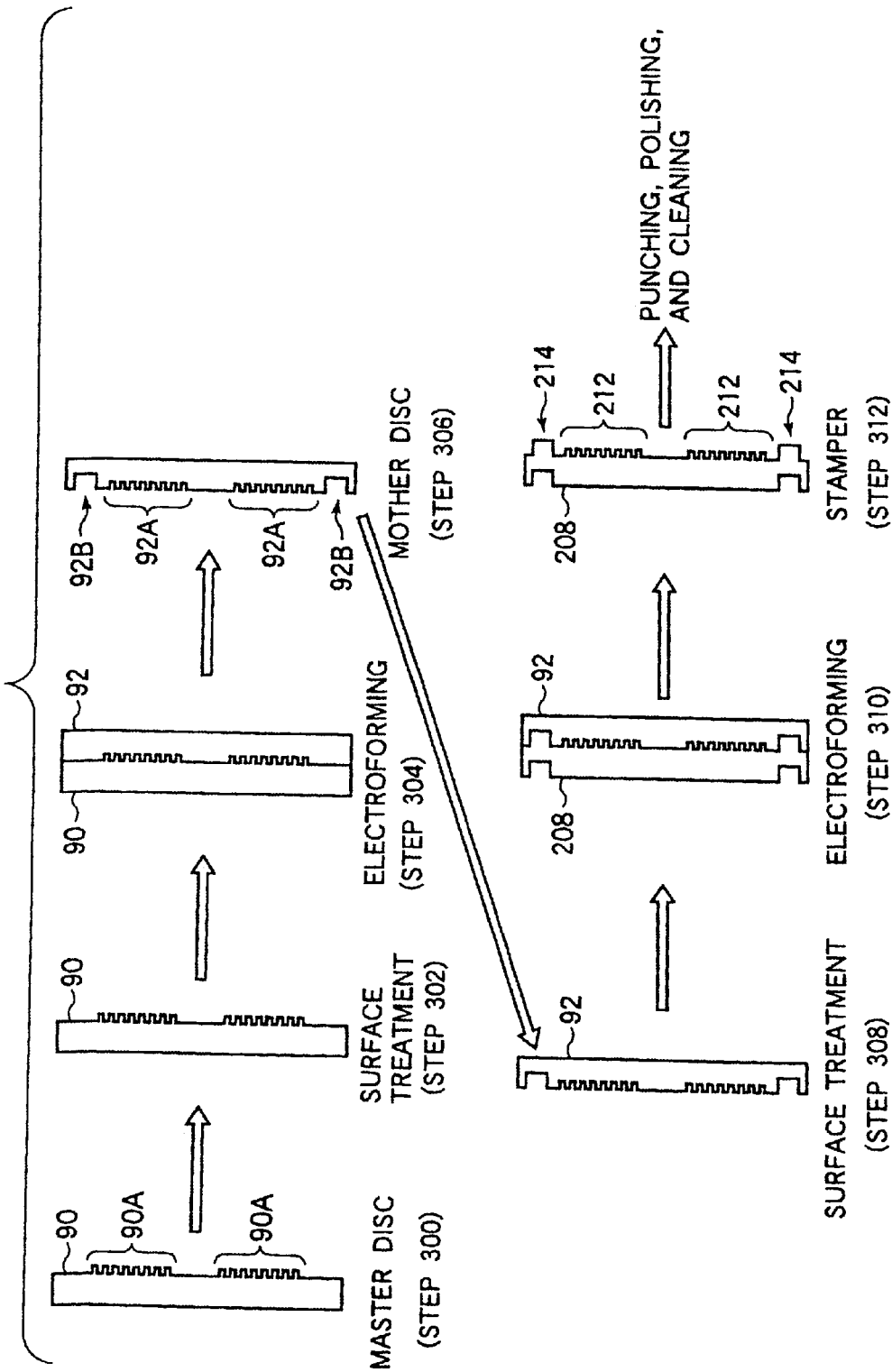
FIG. 3 is a flow chart showing steps of the production process of the stamper.

Next, a method for producing the stamper 208 of the present invention is described with reference to FIG. 3.

First, a master disc 90 is prepared using a glass substrate though the process is not particularly shown. As commonly known, such a master disc can be produced by applying a photoresist to a glass substrate, developing the glass substrate to form microscopic projections/recesses corresponding to the data pattern to be formed on the substrate 12, and then subjecting the master disc to the electroforming process to form a metal layer, which is removed to serve as the metal master. As a result, the master disc 90 includes at least a negative pattern region 90A that serves as a "negative" image of the data pattern to be formed on the substrate 12 (step 300).

The master disc 90 is then subjected to surface treatments (washing and oxidization) (step 302) and then to an electroforming process to form a mother disc 92 having a "positive" pattern region 92A transferred from the negative pattern region 90A (step 304). A recess 92B for forming the stepped portion is cut on the mother disc 92 radially outside with respect to the positive pattern region 92A (step 306). The recess 92B has a larger depth and a larger width than the microscopic projections/recesses of the positive pattern region 92A. The recesses generally have a depth of about 20 to about 250 nm whereas the recess 92I preferably has a depth of about 20 to 300 μm. Aside from cutting, the recess 92B may be formed through etching, laser machining, electric discharge machining, press working or other techniques.

The mother disc 92 is then subjected to surface treatment (step 308) and then to an electroforming process to form the stamper 208 (step 310). The recess 92B on the mother disc 92 forms the stepped portion 214, where the material is bent, on the stamper 208. The positive pattern region 92A is transferred to the negative transfer surface 212 (step 312). Subsequently, the stamper is punched to remove the outer periphery and the central region, is polished and cleaned, and then is mounted on the metal molds.

Figure 4:
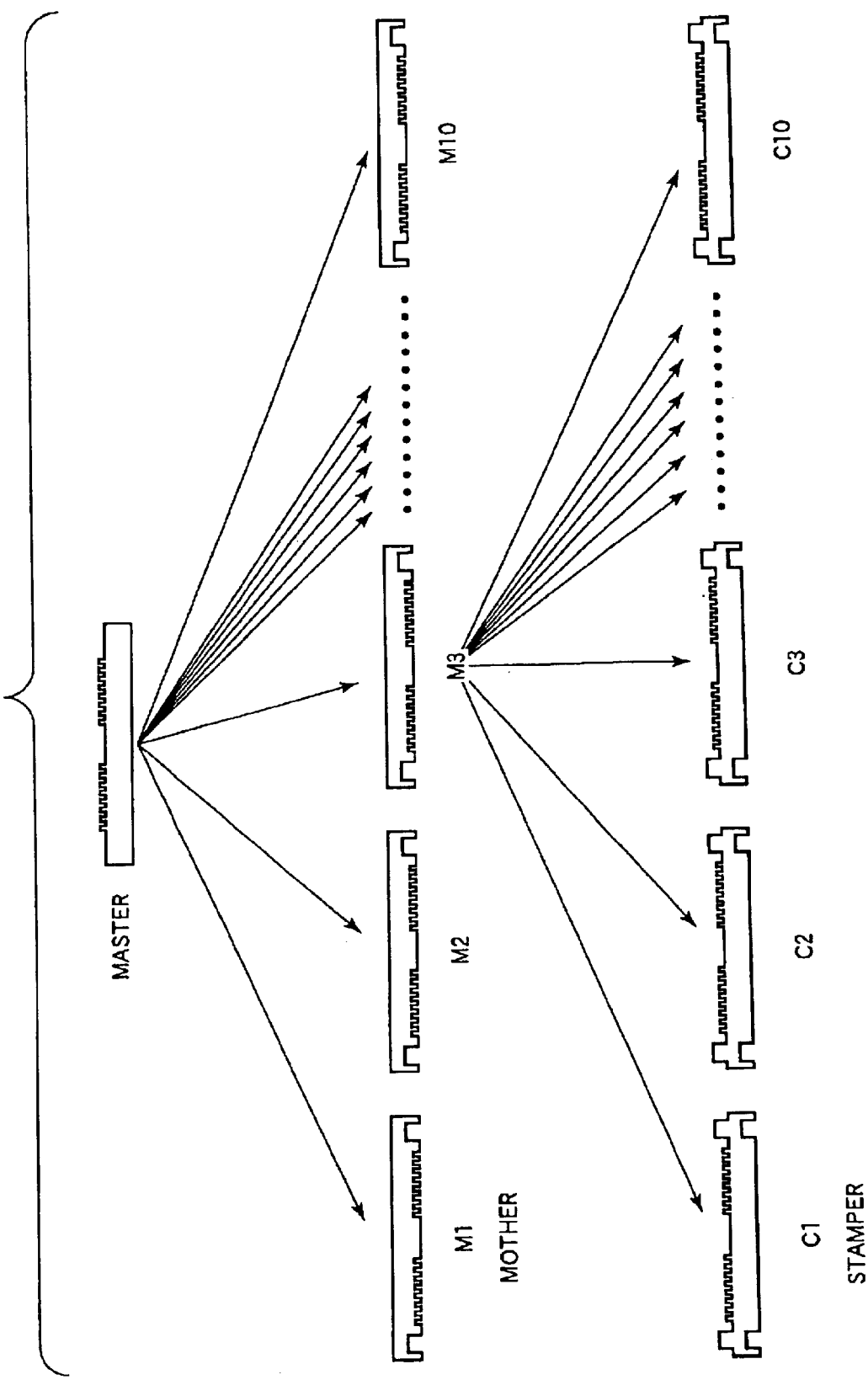
FIG. 4 is a pedigree showing a relationship between a master disc, a mother disc, and a stamper, each used in the production process.

As schematically shown in FIG. 4, with this production method, one master disc 90 can create a plurality (10 in the example shown) of the mother discs M1, M2, . . . , M10, each of which can in turn create a plurality (10 in the example shown) of the stampers C1, C2, . . . , C10. Thus, one master disc can create about 100 stampers. In this manner, stable mass production of recording medium is ensured since each stamper can be used to produce a number of substrates.

Although one example has been shown in which only one type of the mother disc 92 exists between the master disc 90 and the stamper 208, other examples are also contemplated in the present invention. For example, unlike the above-described example, a master disc with a "Positive" pattern may be prepared and used to form a first mother disc having a negative pattern region. The first mother disc is then used to form a second mother disc having a second positive pattern region. On the same side of the second mother disc as the second positive pattern region is then formed a recess having a greater depth and a greater width than the microscopic projections/recesses of the second positive pattern region for forming the stepped portion. This second mother disc is then put to use to produce the stampers. In this manner, one master disc can be used to produce a greater number of stampers. If reduction in the number of the steps is desired, the recess for forming the stepped portion may be formed on the master plate, which is directly used to produce stampers. In short, any of the above-described production processes are suitably used as long as the recess for forming the stepped portion is formed on the stamper production disc (e.g., the above-described master disc or mother disc), which is used in the electroforming process to form stampers.

Next, the substrate 12 produced by using the mold system 200 and optical discs produced by using the substrate 12 are described.

Figure 5:
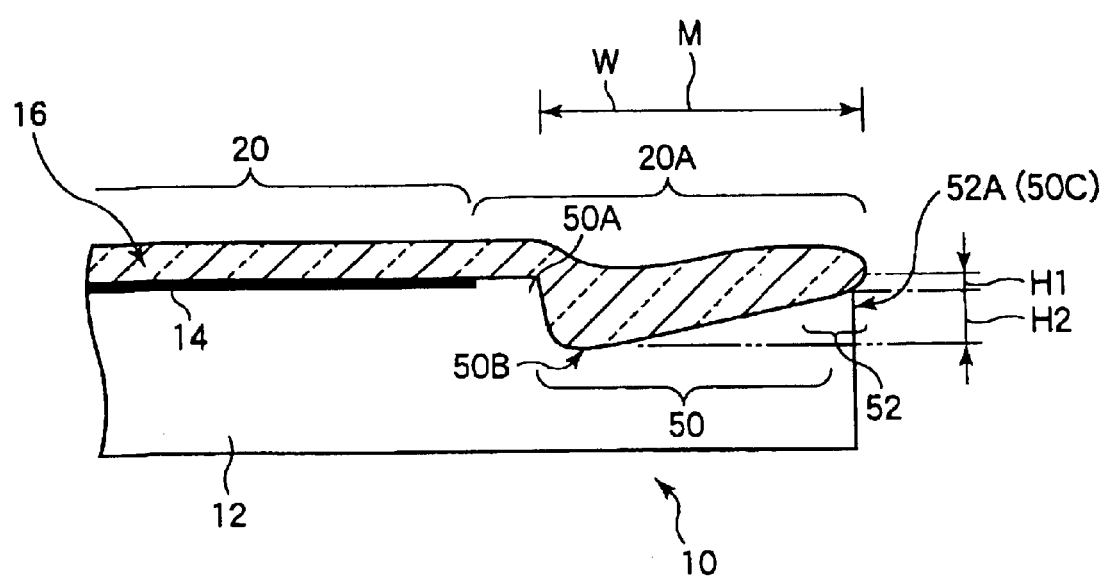
FIG. 5 is an enlarged cross-section showing key construction of an optical disc using a substrate made in the mold system.

As shown in FIG. 5, an optical disc 1 is formed by disposing at least a light-transmitting layer 16 on the substrate 12. If the optical disc 10 is of the Read-Only type, then data pits are formed on the substrate 12. An reflective film made from aluminum or aluminum alloy is formed over the data pits to form the data recording surface 14. If the optical disc 10 is of the recordable type, then lands or grooves are formed on the substrate 12. A reflective film, a recording film with the reflectance varying depending on the types of the recording laser beam or a dielectric film may be overlaid on top of the lands or the grooves. The light-transmitting layer 16 is formed by spin-coating a UV-curing resin solution on the same side of the optical disc 10 as the data recording surface 14 and then irradiating UV-light to harden the resin.

A circumferential recess 50 is formed on the substrate 12 on the same side as the data recording surface 14 in the vicinity of the circumference of the substrate. The recess 50 has a depth that gradually decreases as it extends radially outward and substantially smoothly continues to a peripheral region 52. As a result, the peripheral region 52 has a sharp edge (peripheral edge) 52A as saw-tooth shape in its radial cross-section.

More specifically, the recess 50 is arranged so that a radially innermost edge 50A of the recess 50 is positioned at a distance of 0.965d from the center of the substrate 12 or further, preferably 0.975d or further, and more preferably 0.983d or further, assuming d is the radius of the outermost circumference of the substrate 12.

As used herein, "the center of the substrate" refers to a point given by an intersection of at least two imaginary lines each representing a diameter of the substrate.

A radially outermost edge 50C of the recess 50 (which is the edge 52A in this case) has a height that is lower than the radially innermost edge 50A of the recess 50 by H1 and higher than the deepest point SOB of the recess 50 by H2. In other words, the outermost edge 50C is positioned between the innermost edge 50A and the deepest point 50B when viewed along the thickness of the substrate. The deepest point SOB is positioned radially inward with respect to the midpoint M of the width of the recess 50. As described above, this shape is provided by elastically deforming the stepped portion 214.

In this embodiment, the recess 50 of the substrate 12 has a width W of 1 mm or less, in particular about 0.5 mm. Thus, the area that lies within 1 mm radially inward from the edge 52A of the substrate 12 serves as a blank region 20A, and a signal recording region 20 lies radially inside that area.

The depth of the recess 50 (i.e., the difference in height between the innermost edge 50A and the deepest point SOB (=H1+H2)) is selected such that 0.02 mm<H1+H2<0.4 mm, preferably 0.02 mm<H1+H2<0.2 mm, more preferably 0.02 mm<H1+H2<0.1 mm. The difference H1 in height between the innermost edge 50A and the outermost edge 50C is selected such that 0.01 mm<H1<0.4 mm, preferably 0.01 mm<H1<0.2 mm, more preferably 0.02 mm<H1<O. 1 mm.

Next, a process for spin-coating the light-transmitting layer 16 onto the substrate 12 is described.

Figure 6:
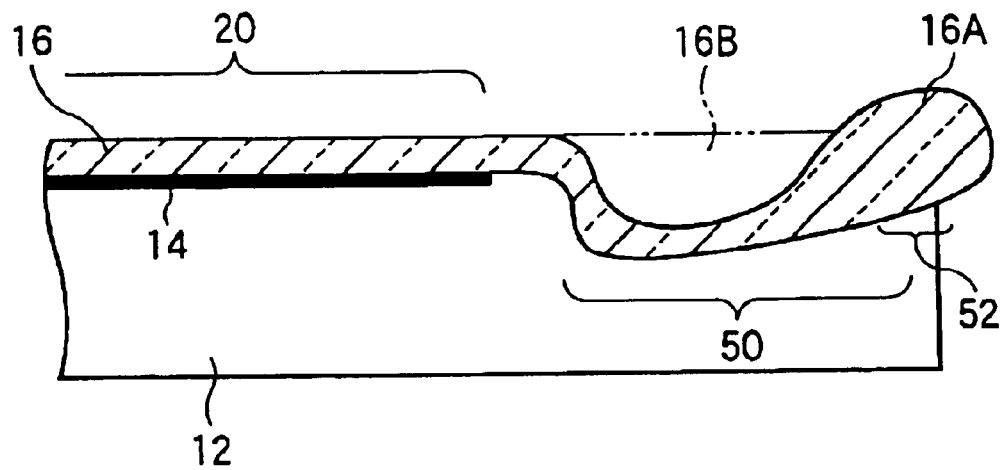
FIG. 6 is an enlarged cross-section showing the key construction of the substrate onto which a light-transmitting layer is being formed through the spin-coating process.

As shown in FIG. 6, when a coating solution (for forming the light transmitting layer 16) is poured onto the rotating substrate 12, a bump 16A is momentarily formed near the peripheral region 52. It is believed that the surface energy of the bump 16A attracts the coating solution (i.e., light-transmitting layer 16) in the recess 50 to the bump 16A, leaving little solution in the recess 50. As a result, a recessed space 16B similar to the recess 50 is formed in the light-transmitting layer 16 at a location corresponding to the recess 50 during the rotation of the substrate 12.

Figure 7:
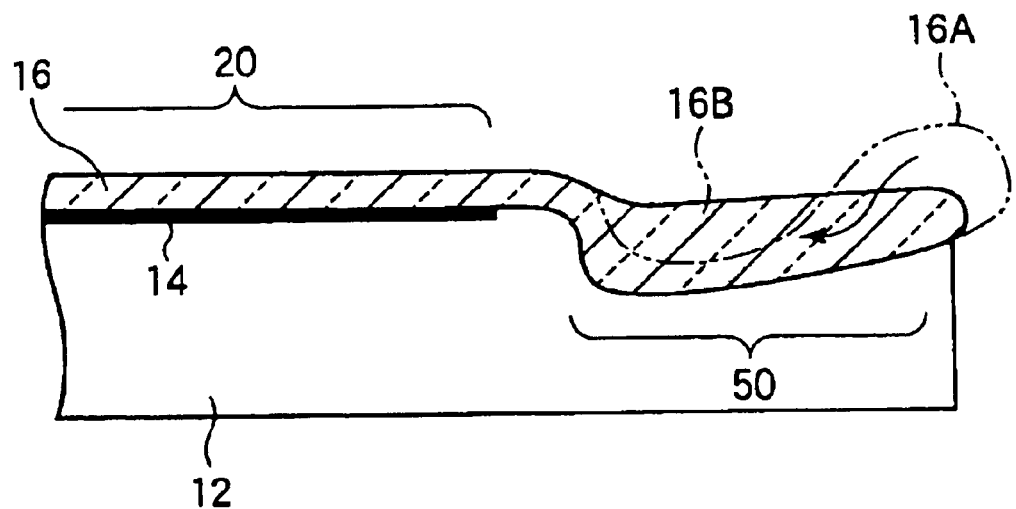
FIG. 7 is an enlarged cross-section showing the key construction of the optical disc with the light-transmitting layer under a curing process.

As shown in FIG. 7, if the rotation of the substrate 12 is stopped at this point, the coating solution in the bump 16A flows radially inward along the slope of the bottom of the recess 50, back into the recessed space 16B. As a result, the coating solution is prevented from remaining in the bump 16A, which makes it possible to make the surface of the light-transmitting layer 16 flatter than in the conventional discs. In this manner, the optical disc 10 as shown in FIG. 5 is obtained.

As described, in this embodiment, formation of the peripheral bump in the light-transmitting layer 16 is actively prevented by the recess 50. In addition, the radial width W of the recess 50 can be made relatively small (for example, 1 mm or less) while preventing bump formation, which makes it possible to design a larger data recording surface 14. Furthermore, the process makes unnecessary the cutting step after formation of the light-transmitting layer 16 (for cutting the bump). Not only does this minimize the cost required for working the optical disc 10 but also prevents the working errors from affecting the dynamic balance of the optical disc 10.

Formation of the recess 50 on the substrate 12 can prevent the formation of the so called ski jump after the substrate is injection-molded.

Figure 8:
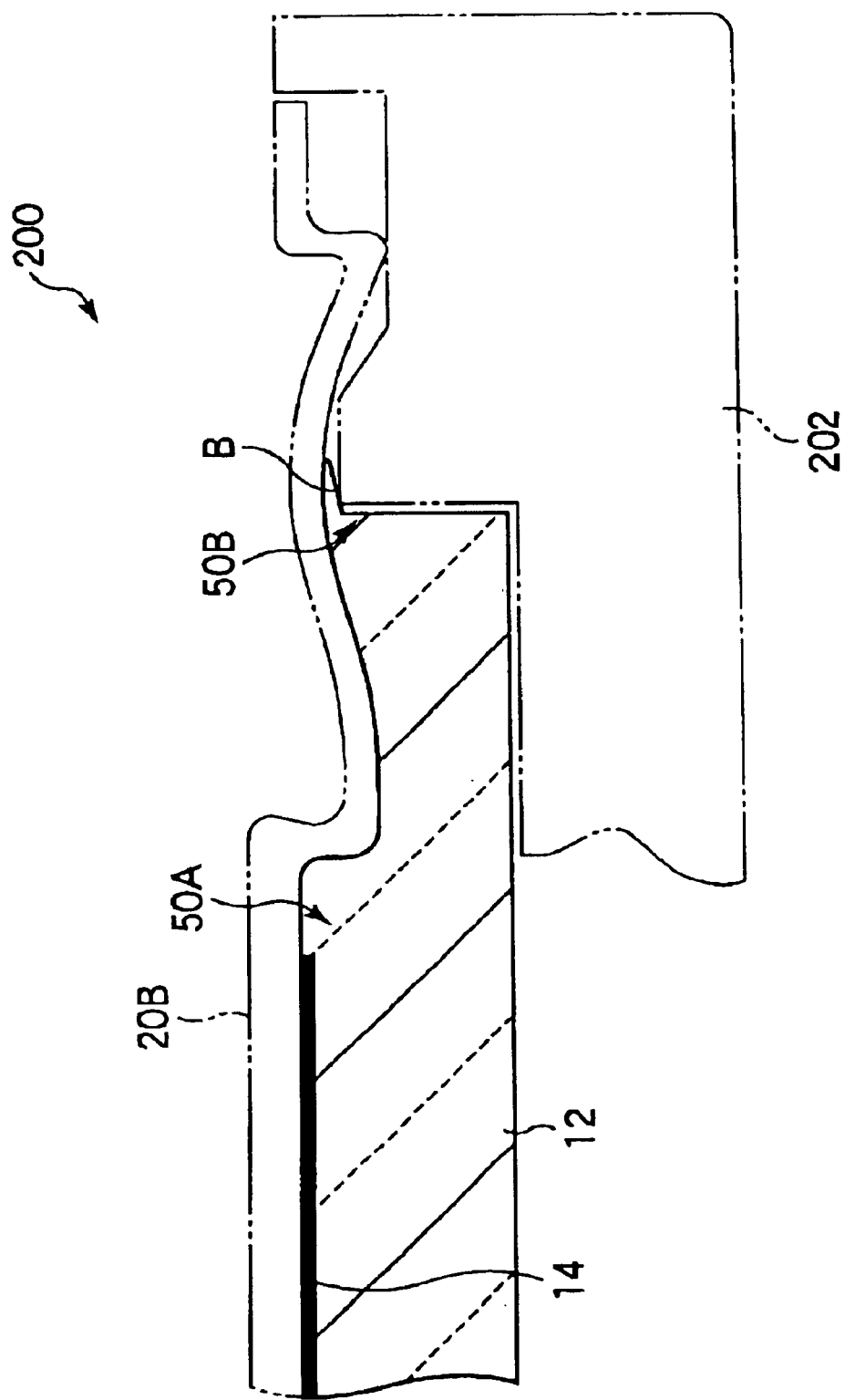
FIG. 8 is a cross-section showing a flash formed on the periphery of the substrate.

As further shown in FIG. 8, with the use of the mold system 200, the flash B is formed at a lower position than the data recording surface 14 when viewed along the thickness of the substrate. This is because the radially outermost edge 50C of the recess 50 is positioned lower than the radially innermost edge 50A of the recess 50 by an amount of H1 when viewed along the thickness of the substrate. In this manner, the flash B little affects the data recording surface 14 and therefore does not need to be removed.

Furthermore, the recess 50 makes the peripheral region 52 of the substrate 12 look saw-tooth shape (in a cross-section). This helps the coating solution spatter off the substrate 12 during the spin-coating process. As a result, accumulation of the coating solution in the peripheral bump is further reduced, resulting in a less significant bump formation.

With the mold system 200 of the present invention, formation of the above-described recess 50 is significantly facilitated by taking advantage of the elastically deformable stepped portion 214 of the stamper 208. Also, as previously described, the flash B is formed in the peripheral region 52 and does not have to be removed. This leads to a reduction in manufacturing costs.

In addition, the elastically deformable stepped portion 214 effectively serves to discharge air in the cavity. Specifically, air pressure builds up in the mold system 200 as the resin material is injected into the mold. As the pressure continues to build up, the stepped portion 214 is elastically deformed to facilitate discharge of the air and, once the air has been discharged, it effectively prevents leakage of the resin by maintaining a predetermined pressure. Aside from these effects, the elastically deformable stepped portion 214 helps prevent excess stress from acting upon the edge 210A of the ring mold 202, thereby extending life of the ring mold 202.

Figure 9:
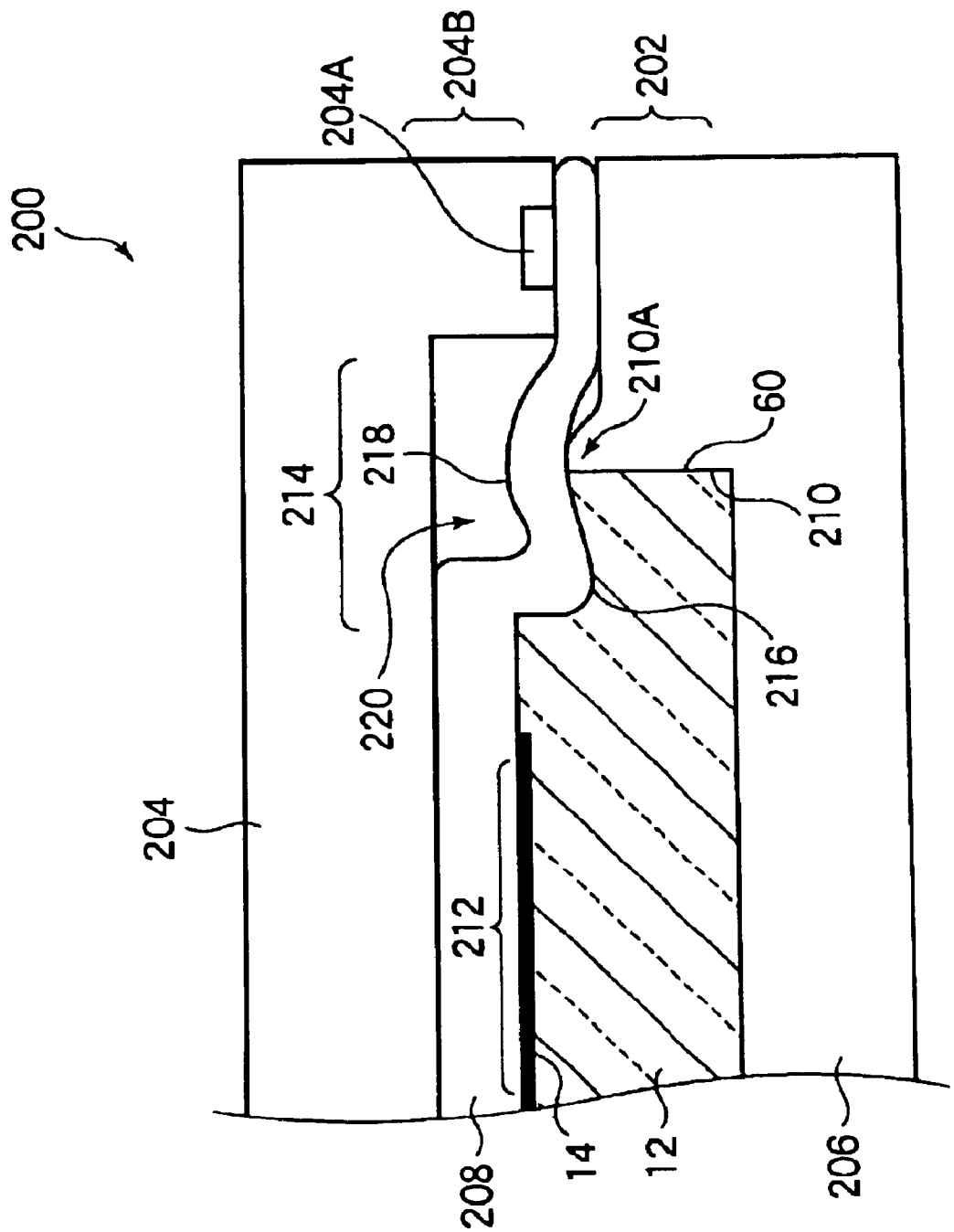
FIG. 9 is a cross-section showing another construction of the stamper in use in the mold system.

While the stamper 208 in this embodiment has the stepped portion 214 with two bends in its radial cross-section, the present invention contemplates other constructions. For example, as shown in FIG. 9, the stamper 208 may include only one bend at a position radially inside the end surface 216 so that the end surface 216 extends radially outward. In such a case, a support member 204B may be provided on the planar mold 204 to project toward the stamper 208, such that the end surface 216 and the edge 210A urge one another with proper force.

As with the above-described mold system, the substrate 12 may be produced through common injection-molding processes and 2P (Photo-Polymer) processes. The injection-molding process is a process in which an acryl or a polycarbonate resin melted by a plasticizer of a molding device is filled into a cavity of a mold fitted with a master disc having microscopic projection/recess patterns for recording/retrieving signals, and the resulting substrate is removed from the mold after the molten resin cools down and is solidified.

The 2P process is a process in which a UV-curing resin or a two-component curing resin is applied between a glass or resin substrate having no microscopic patterns and a master disc having microscopic projection/recess patterns to hold them closely together. After the resin has hardened, the master disc is removed to obtain a substrate with microscopic projection/recess patterns formed thereon. The layers such as the reflective film for forming the data recording surface 14 is formed by depositing a film on the microscopic patterns for the signals to be recorded/retrieved through the spin-coating process, the sputtering process, or the vapor deposition process.

Figure 10:
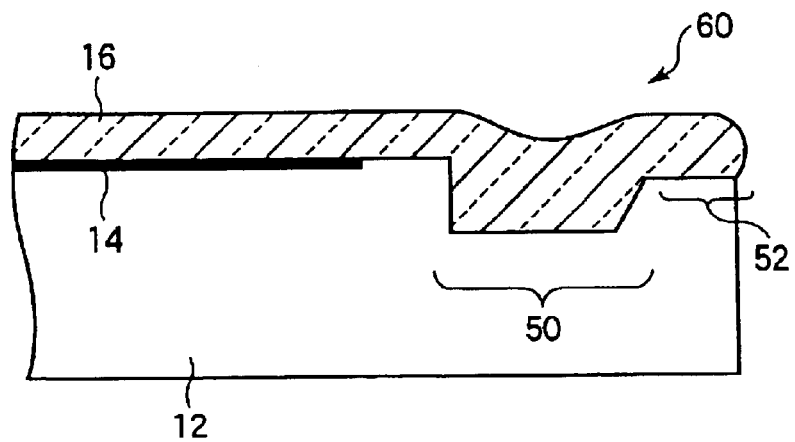
FIG. 10 is an enlarged cross-section showing another construction of the substrate of the optical disc.
Figure 11:
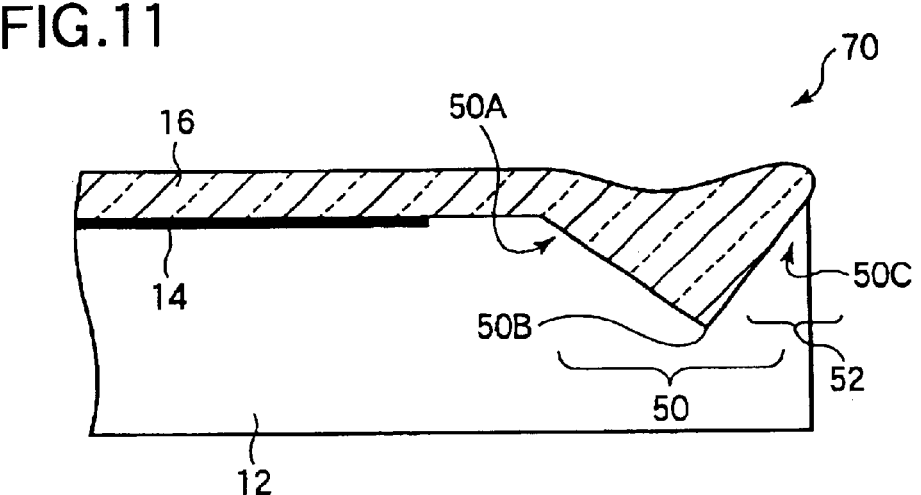
FIG. 11 is an enlarged cross-section showing still another construction of the substrate of the optical disc.
Figure 12:
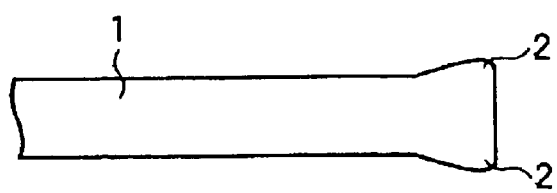
FIG. 12 is an enlarged cross-section showing key construction of a conventional substrate having a bump formed along its circumference.
Figure 13:
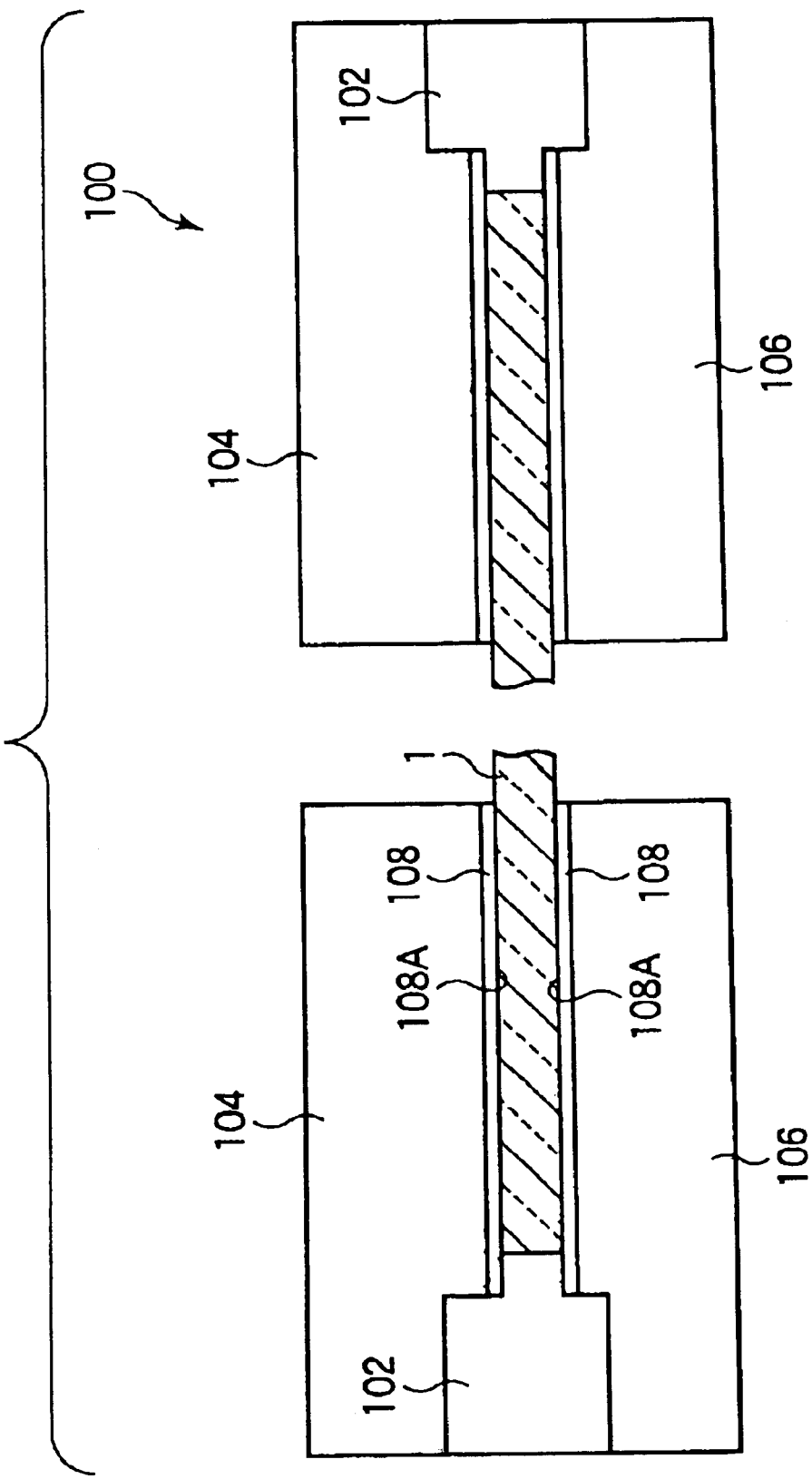
FIG. 13 is a cross-section of a conventional mold system.
Figure 14A:
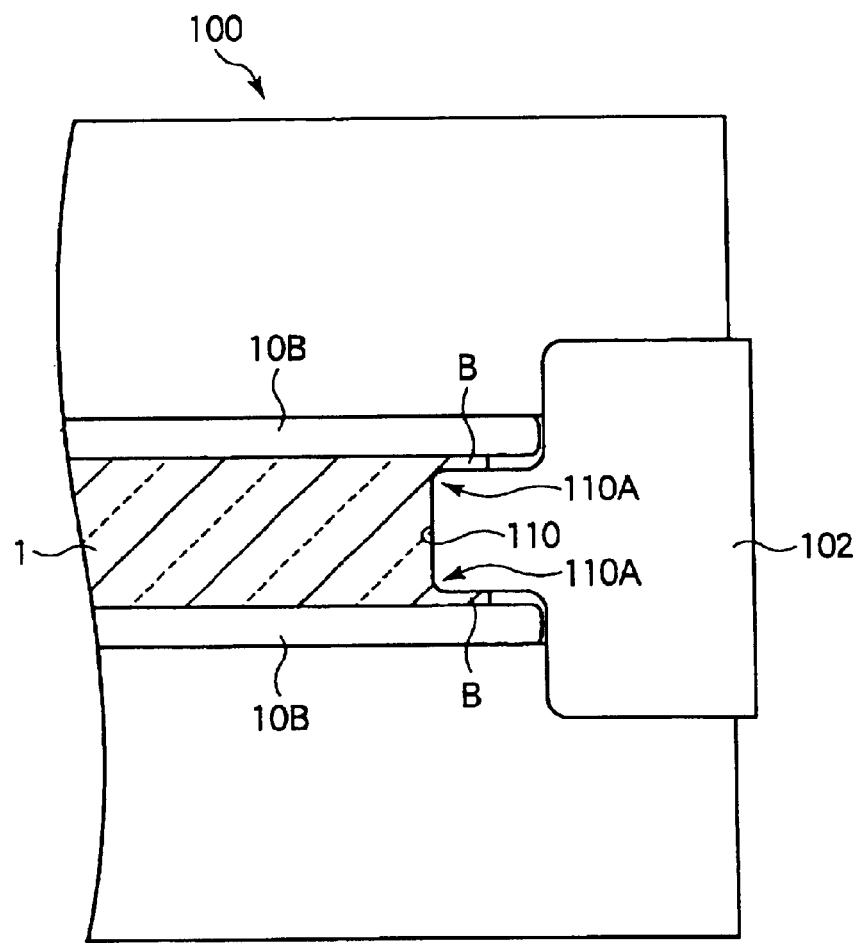
FIG. 14 is a cross-section showing the substrate being formed in the mold system through the injection-molding process.
Figure 14B:
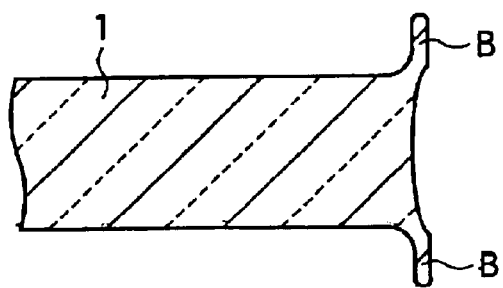
Figure 15:
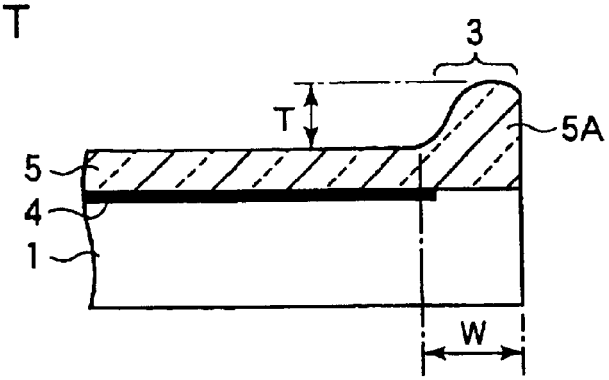
FIG. 15 is an enlarged cross-section of the bump formed in the light-transmitting layer of the substrate.
Figure 16A:
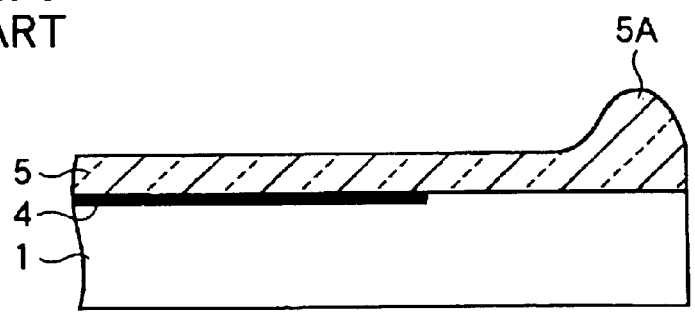
FIG. 16 includes enlarged cross-sections with the upper figure showing the bump formed in the light-transmitting layer of a substrate having a larger diameter and the lower figure showing the substrate with a part of the substrate removed along with the bump.
Figure 16B:
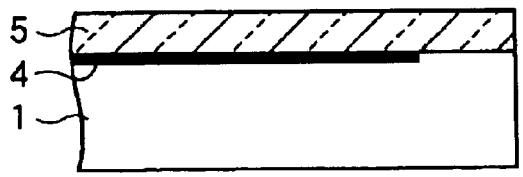

While the substrate 12 in the example shown includes the recess 50 and the peripheral region 52 that are continuous to one another, the present invention contemplates other constructions. For example, as in an optical disc 60 shown in FIG. 10, the substrate 12 may include the peripheral region 52 and the recess 50 separate from one another. Also, the present invention encompasses a construction as exemplified by the optical disc 60 in which the peripheral region 52 does not have saw-tooth shape in its cross-section.

While one example has been shown in which the radially outermost edge 50C of the recess 50 has a height lower than that of the radially innermost edge 50A by an amount of H1 when viewed along the thickness of the substrate, the present invention contemplates other constructions. For example, as in an optical disc 70 shown in FIG. 1, the outermost edge 50C may have substantially the same height as the innermost edge 50A, or it may be higher than the inner most edge 50A. A suitable combination of heights should be chosen in view of the flatness required for the optical disc. It is preferred, however, that the outermost edge 50C be lower than the innermost edge 50A as shown in FIG. 5 since bumps in the light-transmitting layer 16 of relatively various heights can be dissipated in the peripheral region 52.

While one example has been shown in which the substrate 12 is injection-molded and the light-transmitting layer 16 is spincoated, the present invention is not limited to such a case. Also, the recess 50 of the substrate 12 may be formed thorough press working or cutting.

It should be appreciated by those skilled in the art that various modifications and changes may be made to the substrates (including the recess) and the optical discs of the present invention in terms of size and shape without departing from the spirit and the scope of the invention.

Having the construction described thus far, the present invention offers a significant advantage that non-uniformity in shape, such as a bump forming in a light-transmitting layer in its periphery, in a circumferential region of a recording medium substrate is minimized while reducing the manufacturing costs.

What is claimed is:

1. A recording medium substrate for an optical disc including a light-transmitting layer disposed on at least one of surfaces of the recording medium substrate, wherein the recording medium substrate has a circumferential recess formed radially outside a data recording region on one of the surfaces of the recording medium substrate, a radially innermost edge of the recess is positioned at a distance of 0.965d from a center of the substrate or further, assuming d is a radius of an outermost circumference of the substrate.

2. The recording medium substrate for an optical disc according to claim 1, wherein a radially outermost edge of the recess on one of the surfaces is lower than the radially innermost edge of the recess as viewed alone a thickness of the recording medium substrate.

3. The recording medium substrate for an optical disk according to claim 1, wherein a radially outermost edge of the recess on one of the surfaces is lower than the radially innermost edge of the recess and is higher than a deepest point of the recess as viewed along a thickness of the recording medium substrate.

4. The recording medium substrate for an optical disc according to claim 2, wherein the radially outermost edge of the recess on one of the surfaces is lower than the radially innermost edge of the recess and is higher than a deepest point of the recess as viewed alone the thickness of the recording medium substrate.

5. The recording medium substrate for an optical disc according to claim 1, wherein the recess has a depth that gradually decreases as it extends radially outward from a deepest point, the recess substantially smoothly continues to a peripheral region thereof so that the peripheral region has saw-tooth shape in its radial cross-section.

6. The recording medium substrate for an optical disc according to claim 2, wherein the recess has a depth that gradually decreases as it extends radially outward from a deepest point, the recess substantially smoothly continues to a peripheral region thereof so that the peripheral region has saw-tooth shape in its radial cross-section.

7. The recording medium substrate for an optical disc according to claim 3, wherein the recess has a depth that gradually decreases as it extends radially outward from the deepest point, the recess substantially smoothly continues to a peripheral region thereof so that the peripheral region has saw-tooth shape in its radial cross-section.

8. A recording medium substrate made by using a mold system, the mold system comprising:
   a ring mold having an inner peripheral wall for forming an outer peripheral surface of a recording medium substrate;
   a pair of planar molds arranged opposite one another for forming top and bottom surfaces of the recording medium substrate;
   a stamper fitted on at least one of the pair of planar molds, the stamper forming a data recording region on the recording medium substrate through a transfer surface thereof, the transfer surface transferring a predetermined set of data to the recording medium substrate, wherein
   the stamper is provided with a stepped portion formed as bends in a material of the stamper, the stepped portion being configured to project from the transfer surface toward the recording medium substrate,
   the recording medium substrate has a circumferential recess formed radially outside the data recording region on at least one of the surfaces of the recording medium substrate, the recess formed by the stepped portion of the stamper in the mold system, and
   a radially outermost edge of the recess on one of the surfaces is lower than a radially innermost edge of the recess as viewed along a thickness of the recording medium substrate, the radially innermost edge of the recess is positioned at a distance of 0.965d from a center of the substrate or further, assuming d is the radius of the outermost circumference of the substrate.

9. The recording medium substrate according to claim 8, wherein the radially outermost edge of the recess on one of the surfaces is lower than the radially innermost edge of the recess and is higher than a deepest point of the recess as viewed along a thickness of the recording medium substrate.

10. A recording medium substrate made by using a mold system, the mold system comprising:
a ring mold having an inner peripheral wall for forming an outer peripheral surface of a recording medium substrate;
a pair of planar molds arranged opposite one another for forming top and bottom surfaces of the recording medium substrate;
a stamper fitted on at least one of the pair of planar molds, the stamper forming a data recording region on the recording medium substrate through a transfer surface thereof, the transfer surface transferring a predetermined set of data to the recording medium substrate, wherein
the stamper is provided with a stepped portion formed as bends in a material of the stamper, the stepped portion being configured to project from the transfer surface toward the recording medium substrate,
the recording medium substrate has a circumferential recess formed radially outside the data recording region on at least one of the surfaces of the recording medium substrate, the recess formed by the stepped portion of the stamper in the mold system, and
the recess has a depth that gradually decreases as it extends radially outward from a deepest point, the recess substantially smoothly continues to a peripheral region thereof so that the peripheral region has saw-tooth shape in its radial cross-section, and
a radially innermost edge of the recess is positioned at a distance of 0.965d from a center of the substrate or further, assuming d is the radius of the outermost circumference of the substrate.

11. A recording medium substrate made by using a mold system, the mold system comprising:
a ring mold having an inner peripheral wall for forming an outer peripheral surface of a recording medium substrate;
a pair of planar molds arranged opposite one another for forming top and bottom surfaces of the recording medium substrate;
a stamper fitted on at least one of the pair of planar molds, the stamper forming a data recording region on the recording medium substrate through a transfer surface thereof, the transfer surface transferring a predetermined set of data to the recording medium substrate, wherein
the stamper is provided with a stepped portion formed as bends in a material of the stamper, the stepped portion being configured to project from the transfer surface toward the recording medium substrate,
the recording medium substrate has a circumferential recess formed radially outside the data recording region on at least one of the surfaces of the recording medium substrate, the recess formed by the stepped portion of the stamper in the mold system, and
a radially innermost edge of the recess is positioned at a distance of 0.965d from a center of the substrate or further, assuming d is the radius of the outermost circumference of the substrate.

12. The recording medium substrate for an optical disc according to claim 1, the radially innermost edge of the recess is positioned at a distance of 0.975d from the center of the substrate or further.

13. The recording medium substrate for an optical disc according to claim 12, wherein a radially outermost edge of the recess on one of the surfaces is lower than the radially innermost edge of the recess as viewed along a thickness of the recording medium substrate.

14. The recording medium substrate for an optical disc according to claim 12, wherein a radially outermost edge of the recess on one of the surfaces is lower than the radially innermost edge of the recess and is higher than a deepest point of the recess as viewed along a thickness of the recording medium substrate.

15. The recording medium substrate for an optical disc according to claim 13, wherein the radially outermost edge of the recess on one of the surfaces is lower than the radially innermost edge of the recess and is higher than a deepest point of the recess as viewed along the thickness of the recording medium substrate.

16. The recording medium substrate for an optical disc according to claim 12, wherein the recess has a depth that gradually decreases as it extends radially outward from a deepest point, the recess substantially smoothly continues to a peripheral region thereof so that the peripheral region has saw-tooth shape in its radial cross-section.

17. The recording medium substrate for an optical disc according to claim 13, wherein the recess has a depth that gradually decreases as it extends radially outward from a deepest point, the recess substantially smoothly continues to a peripheral region thereof so that the peripheral region has saw-tooth shape in its radial cross-section.

18. The recording medium substrate for an optical disc according to claim 14, wherein the recess has a depth that gradually decreases as it extends radially outward from the deepest point, the recess substantially smoothly continues to a peripheral region thereof so that the peripheral region has saw-tooth shape in its radial cross-section.

19. The recording medium substrate according to claim 8, wherein the radially innermost edge of the recess is positioned at a distance of 0.975d from the center of the substrate or further.

20. The recording medium substrate according to claim 19, wherein the radially outermost edge of the recess on one of the surfaces is lower than the radially innermost edge of the recess and is higher than a deepest point of the recess as viewed along a thickness of the recording medium substrate.

21. The recording medium substrate according to claim 10, wherein the radially innermost edge of the recess is positioned at a distance of 0.975d from the center of the substrate or further.

22. The recording medium substrate according to claim 11, wherein the radially innermost edge of the recess is positioned at a distance of 0.975d from the center of the substrate or further.

23. The recording medium substrate for an optical disc according to claim 1, wherein the radially innermost edge of the recess is positioned at a distance of 0.983d from the center of the substrate or further.

24. The recording medium substrate for an optical disc according to claim 23, wherein a radially outermost edge of the recess on one of the surfaces is lower than the radially innermost edge of the recess as viewed along a thickness of the recording medium substrate.

25. The recording medium substrate for an optical disc according to claim 23, wherein a radially outermost edge of the recess on one of the surfaces is lower than the radially innermost edge of the recess and is higher than a deepest point of the recess as viewed along a thickness of the recording medium substrate.

26. The recording medium substrate for an optical disc according to claim 24, wherein the radially outermost edge of the recess on one of the surfaces is lower than the radially innermost edge of the recess and is higher than a deepest point of the recess as viewed along the thickness of the recording medium substrate.

27. The recording medium substrate for an optical disc according to claim 23, wherein the recess has a depth that gradually decreases as it extends radially outward from a deepest point, the recess substantially smoothly continues to a peripheral region thereof so that the peripheral region has saw-tooth shape in its radial cross-section.

28. The recording medium substrate for an optical disc according to claim 24, wherein the recess has a depth that gradually decreases as it extends radially outward from a deepest point, the recess substantially smoothly continues to a peripheral region thereof so that the peripheral region has saw-tooth shape in its radial cross-section.

29. The recording medium substrate for an optical disc according to claim 25, wherein the recess has a depth that gradually decreases as it extends radially outward from the deepest point, the recess substantially smoothly continues to a peripheral region thereof so that the peripheral region has saw-tooth shape in its radial cross-section.

30. The recording medium substrate according to claim 8, wherein the radially innermost edge of the recess is positioned at a distance of 0.983d from the center of the substrate or further.

31. The recording medium substrate according to claim 30, wherein the radially outermost edge of the recess on one of the surfaces is lower than the radially innermost edge of the recess and is higher than a deepest point of the recess as viewed along a thickness of the recording medium substrate.

32. The recording medium substrate according to claim 10, wherein the radially innermost edge of the recess is positioned at a distance of 0.983d from the center of the substrate or further.

33. The recording medium substrate according to claim 11, wherein the radially innermost edge of the recess is positioned at a distance of 0.983d from the center of the substrate or further, assuming d is the radius of the outermost circumference of the substrate.

* * * * *